(12) United States Patent
Boston et al.

(10) Patent No.: US 8,926,279 B2
(45) Date of Patent: Jan. 6, 2015

(54) PROPELLER HUB

(75) Inventors: Eric Jacques Boston, Cesson (FR); Michel Andre Bouru, Montereau sur le Jard (FR); Laurent Jablonski, Melun (FR); Philippe Gerard Edmond Joly, Vaux le Penil (FR)

(73) Assignee: SNECMA, Paris (FR)

( * ) Notice: Subject to any disclaimer, the term of this patent is extended or adjusted under 35 U.S.C. 154(b) by 459 days.

(21) Appl. No.: 13/382,026

(22) PCT Filed: Jul. 2, 2010

(86) PCT No.: PCT/EP2010/059467
§ 371 (c)(1),
(2), (4) Date: Jan. 3, 2012

(87) PCT Pub. No.: WO2011/000943
PCT Pub. Date: Jan. 6, 2011

(65) Prior Publication Data
US 2012/0099989 A1    Apr. 26, 2012

(30) Foreign Application Priority Data

Jul. 2, 2009  (FR) ..................................... 09 54561

(51) Int. Cl.
| | | |
|---|---|---|
| *F01D 7/00* | (2006.01) | |
| *F01D 1/24* | (2006.01) | |
| *F04D 29/32* | (2006.01) | |
| *B64C 11/30* | (2006.01) | |
| *F02K 3/072* | (2006.01) | |
| *B64D 27/00* | (2006.01) | |

(52) U.S. Cl.
CPC ............ *F04D 29/321* (2013.01); *B64C 11/306* (2013.01); *F02K 3/072* (2013.01); *B64D 2027/005* (2013.01); *Y02T 50/66* (2013.01)
USPC ..... 416/129; 416/205; 416/219 R; 416/220 R

(58) Field of Classification Search
USPC ............... 416/129, 204 R, 205, 219 R, 220 R
See application file for complete search history.

(56) References Cited

U.S. PATENT DOCUMENTS 5,082,424 A * 1/1992 Husain et al. .................. 416/158
5,112,191 A * 5/1992 Strock et al. .................... 416/94
(Continued)

FOREIGN PATENT DOCUMENTS

FR          2 641 251        7/1990

OTHER PUBLICATIONS

International Search Report Issued Sep. 28, 2010 in PCT/EP10/059467 Filed Jul. 2, 2010.

(Continued)

*Primary Examiner* — Igor Kershteyn
(74) *Attorney, Agent, or Firm* — Oblon, Spivak, McClelland, Maier & Neustadt, L.L.P.

(57) ABSTRACT

A hub of a propeller with variable-pitch blades for a turbine engine, for example for a propfan engine. The hub of the propeller includes a polygonal ring with substantially radial cylindrical recesses distributed about a central axis of the ring for receiving the blades, a turbine rotor element of the turbine engine, and a securing flange that is attached to the ring so as to connect the ring to the rotor element. The hub further includes a plurality of back-up hooks inserted with clearance in openings, the back-up hooks being connected either to the ring or to the rotor element, and the openings being connected to the other one of the two.

13 Claims, 5 Drawing Sheets

(56) References Cited

U.S. PATENT DOCUMENTS

| | | |
|---|---|---|
| 5,224,831 A | 7/1993 | Hermans et al. |
| 5,263,898 A * | 11/1993 | Elston et al. ............ 416/147 |
| 8,382,442 B2 * | 2/2013 | Boston et al. ............ 416/248 |
| 2010/0239421 A1 | 9/2010 | Boston et al. |
| 2012/0045334 A1 | 2/2012 | Bouru et al. |

OTHER PUBLICATIONS

U.S. Appl. No. 13/389,031, filed Feb. 6, 2012, Boston, et al.

\* cited by examiner

PROPELLER HUB

The present invention relates to a propeller hub with variable-pitch blades for a turboengine of the open rotor type.

The fan of a turboengine of this type typically comprises two coaxial, counter-rotating external propellers, one upstream and one downstream, which are each driven in rotation by a turbine of the turboengine and extend substantially radially to the exterior of the nacelle of this turboengine.

Each propeller comprises a hub that includes a polygonal ring with substantially radial cylindrical recesses distributed about the longitudinal axis of the turboengine and which receive the blades of the propeller. The hub further comprises a rotor element of the turbine and a securing flange connecting the polygonal ring to the rotor element.

The blades are able to turn in the recesses of the polygonal ring and are driven in rotation about the axes of the blades by appropriate means, in such a manner as to adjust the angular pitch of the blades and to optimize said pitch as a function of the turboengine operating conditions.

During operation, the blades of the propeller are subjected to very significant centrifugal forces, which may be as high as 30 000 daN, these forces being transmitted to the polygonal ring. In the event of rupture of the polygonal ring, the blades could become detached, causing very considerable structural damage around the turboengine.

The object of the invention is, in particular, to provide a simple, effective and economical solution to this problem.

The subject matter of the invention is a propeller hub of the above-mentioned type that provides security against failures of the polygonal ring.

To that end, it proposes a propeller hub with variable-pitch blades for a turboengine, the hub comprising a polygonal ring with substantially radial cylindrical recesses distributed about a central axis of the ring for receiving said blades, a turbine rotor element of the turboengine, and a securing flange attached to the ring so as to connect said ring to the rotor element, and a plurality of back-up hooks inserted with clearance in openings, the back-up hooks being connected to either the ring or the rotor element, and the openings being connected to the other one of the two.

In the event of rupture or radial deformation of the polygonal ring and/or of the securing flange, said back-up hooks take up the radial stress, thereby ensuring at least retention of the ring and limiting potential damage arising from this failure.

Advantageously, said back-up hooks are held by radial plates that can be attached to said rotor element.

In a first embodiment, each radial plate bears at least two pins of substantially circular cross section, which form back-up hooks.

In a second embodiment, said back-up hooks have a non-round cross section, just like said openings.

In either case, said back-up hooks may be attached to said radial plates or may be formed as a single piece together with said plates.

In both cases, the back-up hooks limit not only the translation but also the rotation of a sector of the polygonal ring relative to the corresponding radial plate in a radial plane of the polygonal ring.

Advantageously, said securing flange is attached to a side of the ring, and said plates are placed on a side axially opposite the ring, in such a manner as to limit the axial movement of the ring.

Advantageously, said hub further comprises axial means for attaching said hooks in a direction parallel to the central axis of the ring, such as, for example, bolts connecting the plates to the rotor element that are oriented parallel to the central axis of the ring.

More particularly, said plates comprise a relief that allows positive engagement in a radial plane with a support of said plates. This positive engagement thus blocks movement of the plates in a radial plane while the plates are held against their support by said axial attachment means. This engagement may, for example, be formed by a central projection in the support engaging a central notch in the plate, and two lateral projections in the support each engaging a lateral edge of the plate.

Details relating to the invention are described below, with reference to the drawings.

Figure 1:
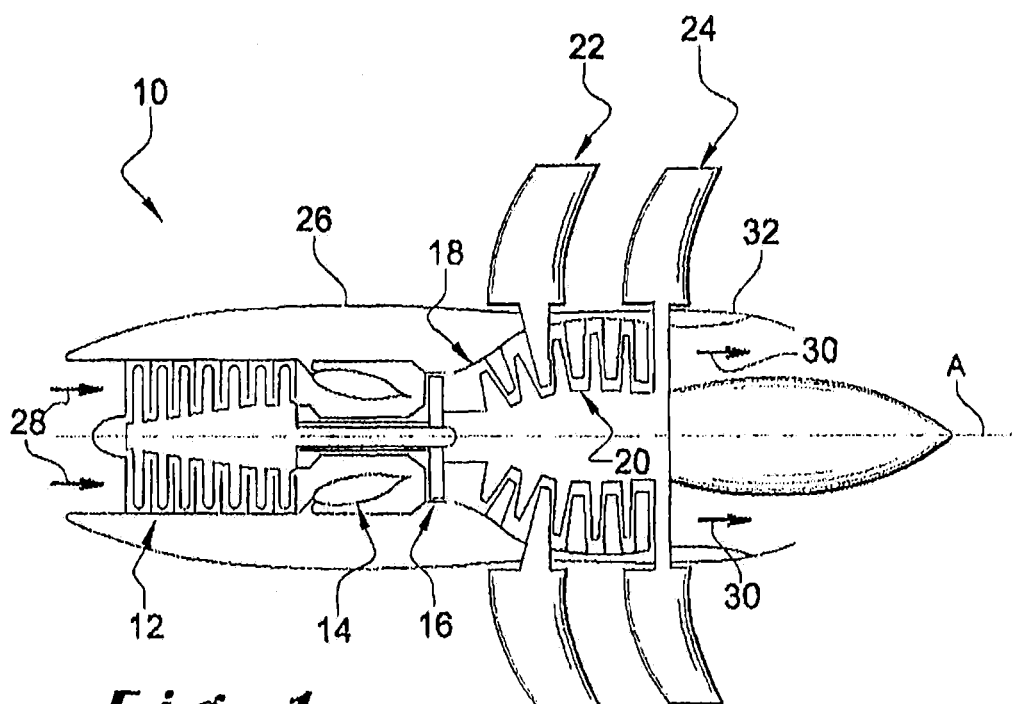
FIG. 1 illustrates a turboengine of the open propeller type.

Reference is, first, made to FIG. 1, which represents an open rotor turboengine 10, which comprises, from upstream to downstream, in the direction of flow of the gases inside the turboengine, a compressor 12, an annular combustion chamber 14, a high-pressure turbine 16, and two low-pressure turbines 18, 20 that are counter-rotating, i.e. they turn in two opposite directions about the longitudinal axis A of the turboengine.

Each of these downstream turbines 18, 20 rotates together with an external propeller 22, 24 extending radially outside the nacelle 26 of the turboengine, this nacelle 26 being substantially cylindrical and extending along the axis A around the compressor 12, the combustion chamber 14, and the turbines 16, 18 and 20.

The flow of air 28 that penetrates the turboengine is compressed and then mixed with fuel and burnt in the combustion chamber 14, the combustion gases then passing into the turbines in order to drive, in rotation, the propellers 22, 24 that provide the major part of the thrust generated by the turboengine. The combustion gases exiting the turbines are expelled via a hose 32 (arrows 30) in order to increase thrust.

The propellers 22, 24 are arranged coaxially, one behind the other, and comprise a plurality of blades regularly distributed about the axis A of the turboengine. These blades extend substantially radially and are of the variable-pitch type, i.e. they are able to rotate about their axes in such a manner as to optimize their angular position as a function of turboengine operating conditions.

Figure 2:
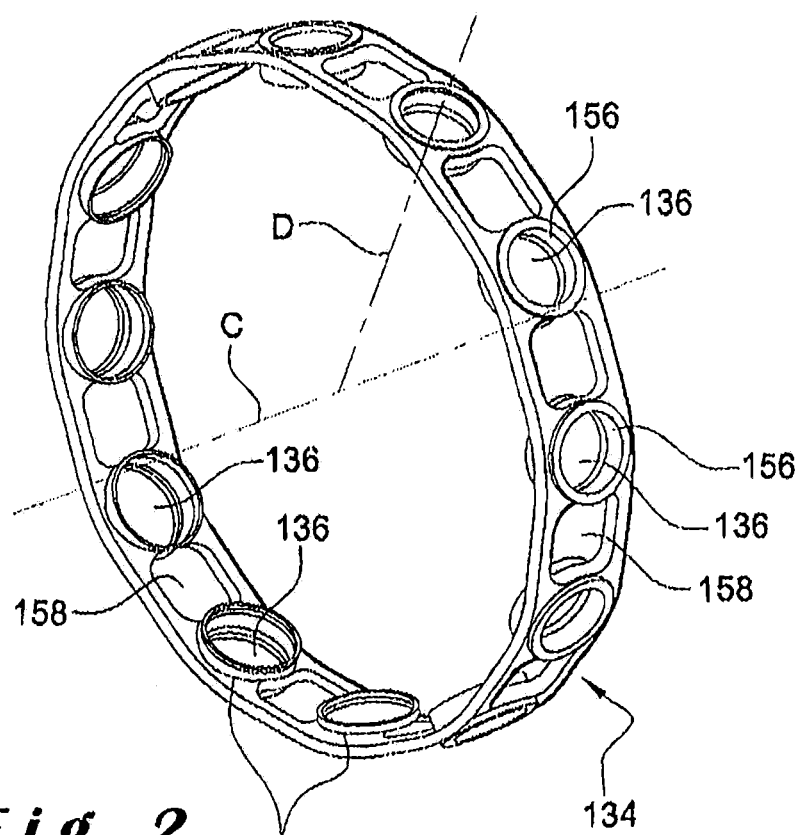
FIG. 2 illustrates, in perspective, a polygonal ring for holding open rotor blades according to the prior art.

In a preceding structure, each propeller comprises a rotor element formed by a polygonal ring that extends around the axis A and includes a plurality of substantially cylindrical radial recesses in which the means for mounting the propeller blades are engaged. A polygonal ring 134 of this type is illustrated in FIG. 2. It comprises substantially radial cylindrical recesses 136 that have cylindrical walls 156 and a plurality of apertures 158 regularly distributed about the central axis C of the ring and formed in the ring in order to lighten the latter. Each aperture 158 is located between two consecutive radial recesses 136.

A polygonal ring 134 of this type constitutes a critical failure point for the turboengine. In the event of rupture of the polygonal ring 134 or of the link between the ring and the turbine, the propeller blades could become detached and, impelled by centrifugal forces, give rise to very considerable damage around the turboengine. Measures must therefore be taken to obviate this risk.

Figure 3:
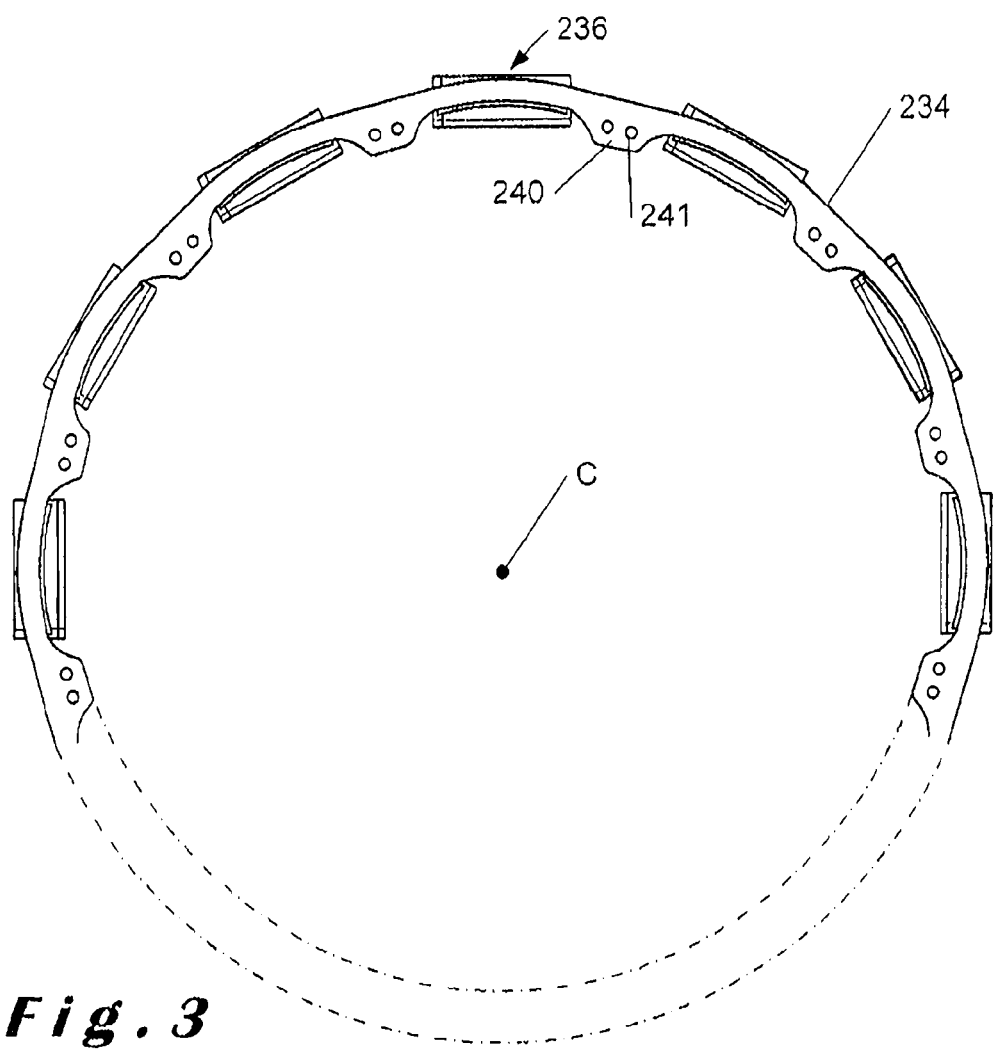
FIG. 3 shows a front view of the polygonal ring of a propeller hub according to a first embodiment of the invention.

A polygonal ring 234, forming part of a propeller hub according to a first embodiment of the invention, is illustrated in FIG. 3. Just like the ring 134, this ring 234 also comprises cylindrical recesses 236 distributed radially about the ring in order to receive the blades. However, this ring 234 also comprises radial projections 240 distributed radially about the ring and each having two cylindrical openings 241 substantially parallel to the central axis C of the ring. These radial projections 240 are intercalated between the cylindrical recesses 236 in such a manner as not to interfere with the latter.

Figure 5:
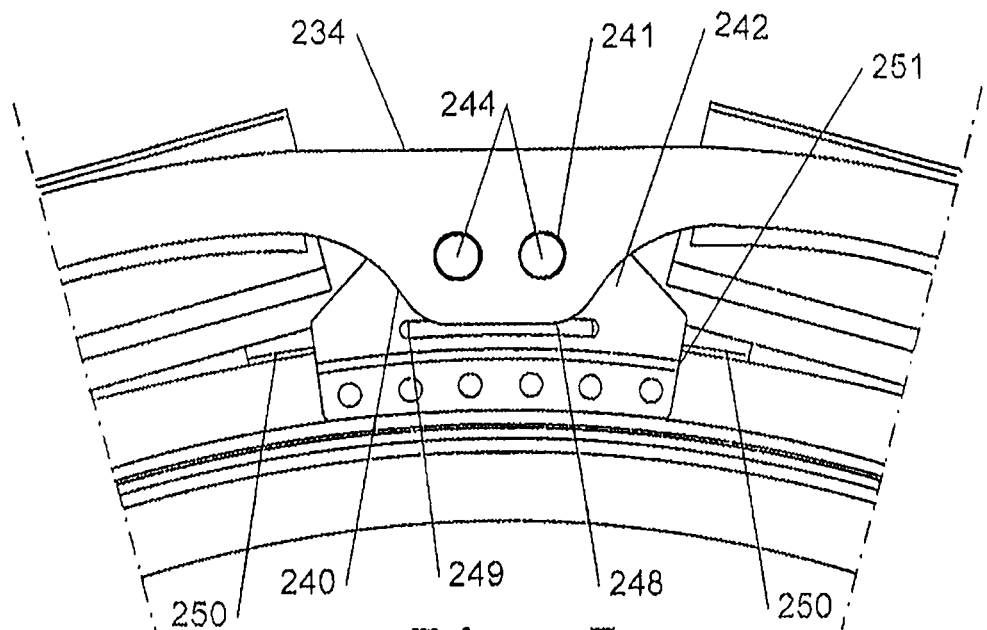
FIG. 5 shows a detailed view of the polygonal ring of FIG. 3 attached to a turboengine rotor element.

With reference to FIG. 5, the propeller hub according to this first embodiment of the invention comprises radial plates 242 designed to be connected to a turbine rotor element 243, each carrying two pins 244 of round cross section received with clearance in the two openings 241 of a radial projection 240 of the ring 234. The pins form back-up hooks.

Figure 7:
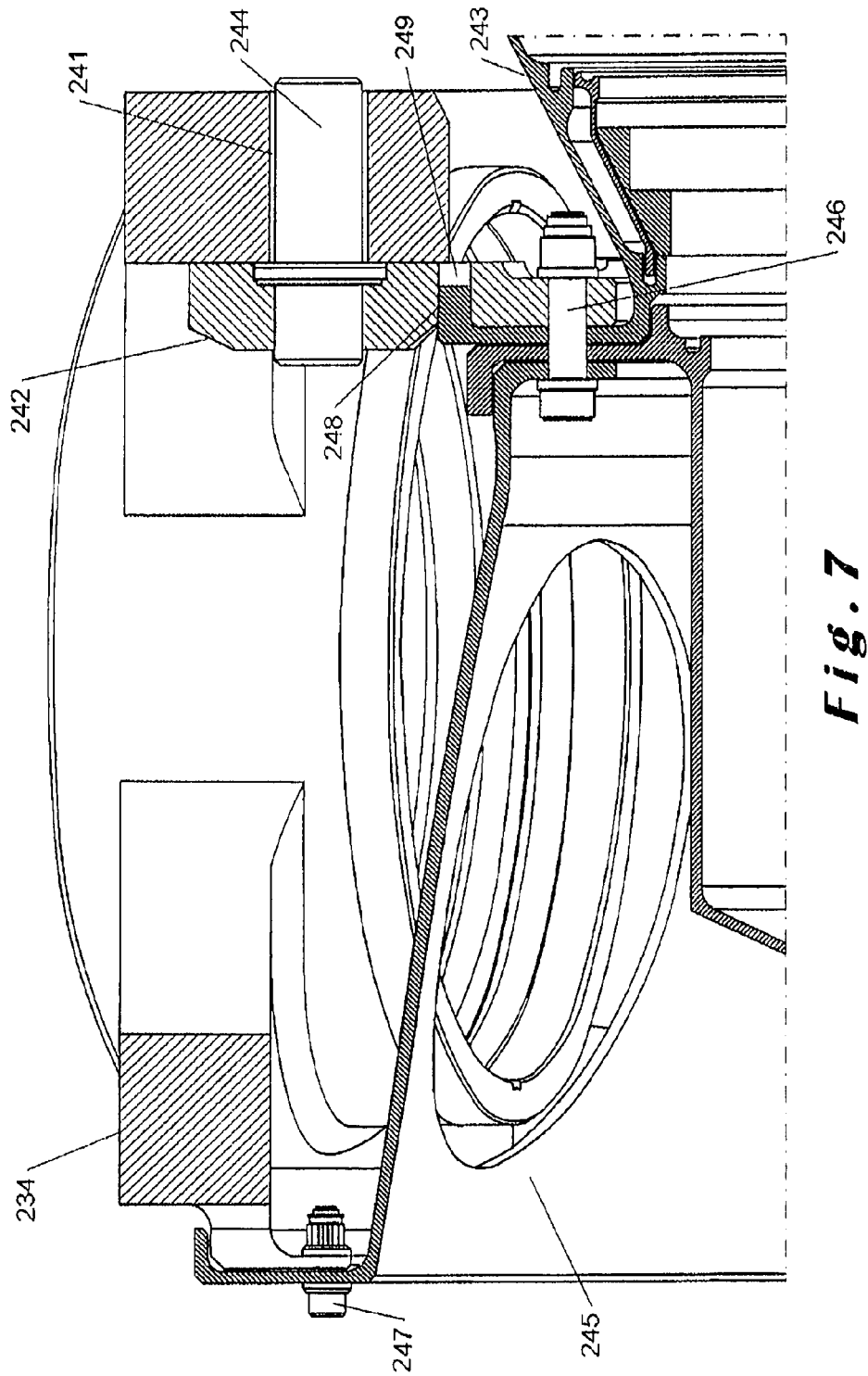
FIG. 7 shows a partial longitudinal section of the polygonal ring of FIG. 3 attached to a turboengine rotor element.

As illustrated in FIG. 7, the ring 234 is attached to the rotor element 243 by a securing flange 245. This securing flange 245 is attached to the rotor element 243 by bolts 246 and to the ring 234, on a side axially opposite the radial plates 242, by bolts 247.

The radial plates 242 are attached to the rotor element 243 by the same bolts 246 attaching the securing flange 245. These bolts 246 are substantially oriented in the direction of the central axis of the ring 234. Furthermore, the rotor element 243 has, for each plate 242, a central projection 248 engaging a central notch 249 in the plate 242, and two lateral projections 250, each making contact with a lateral edge 251 of the plate 242. Thus, these projections in the rotor element 243 form a positive engagement with the plate 242 in a radial plane perpendicular to the central axis of the ring 234.

In normal operation, as the pins 244 are received with clearance in the openings 241, no stress is transmitted via the plates 242. All the stresses from the ring 234 toward the rotor element 243 are transmitted by the securing flange 245. However, in the event of rupture or substantial radial deformation of the ring 234 and/or of the securing flange 245, the pins 244 make contact with the walls of the openings 241 and take up at least a part of the radial retention stresses of at least one section of the ring 234. The pins 244 thus form back-up hooks of the ring 236. As each plate 242 bears two pins 244 and is in positive engagement in the radial plane with the rotor element 243, the plates 242 are able to transmit, to said rotor element 243, not only stresses but also local torque in the radial plane. In this way, the plates 242 offer additional security against rupture of the propeller hub according to the invention.

Figure 4:
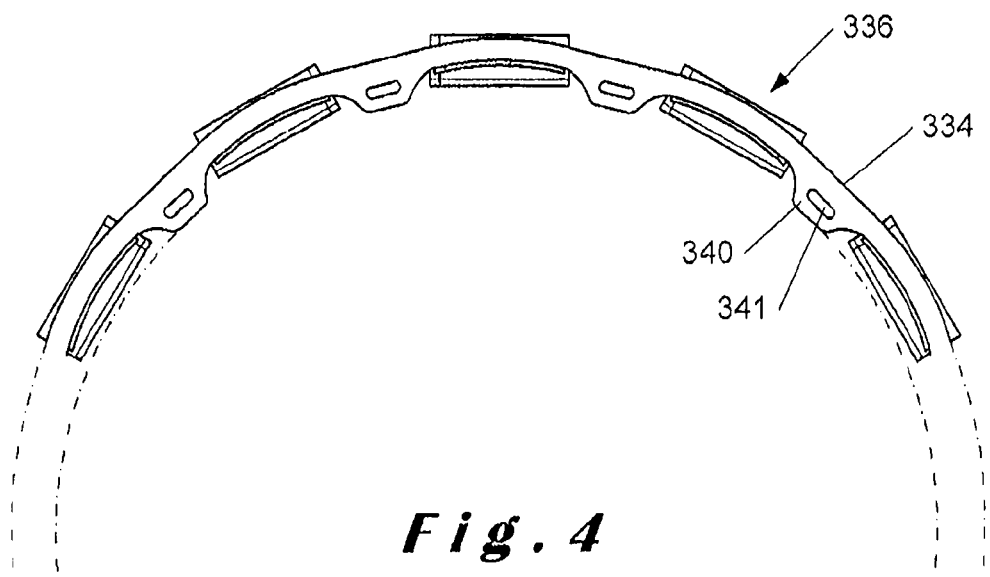
FIG. 4 shows a front view of the polygonal ring of a propeller hub according to a second embodiment of the invention.
Figure 6:
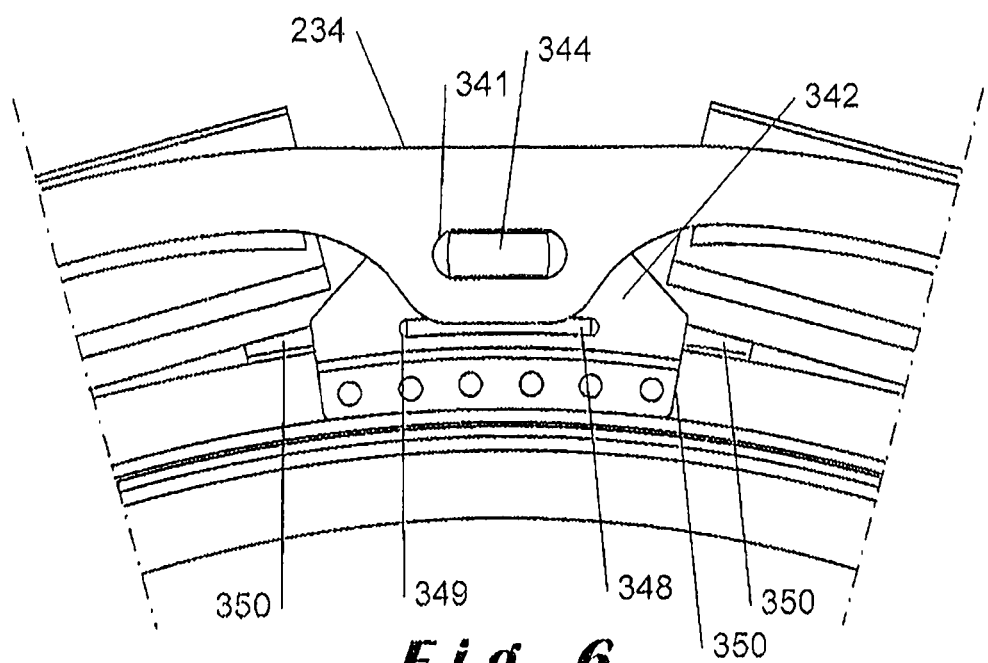
FIG. 6 shows a detailed view of the polygonal ring of FIG. 4 attached to a turboengine rotor element.
Figure 8:
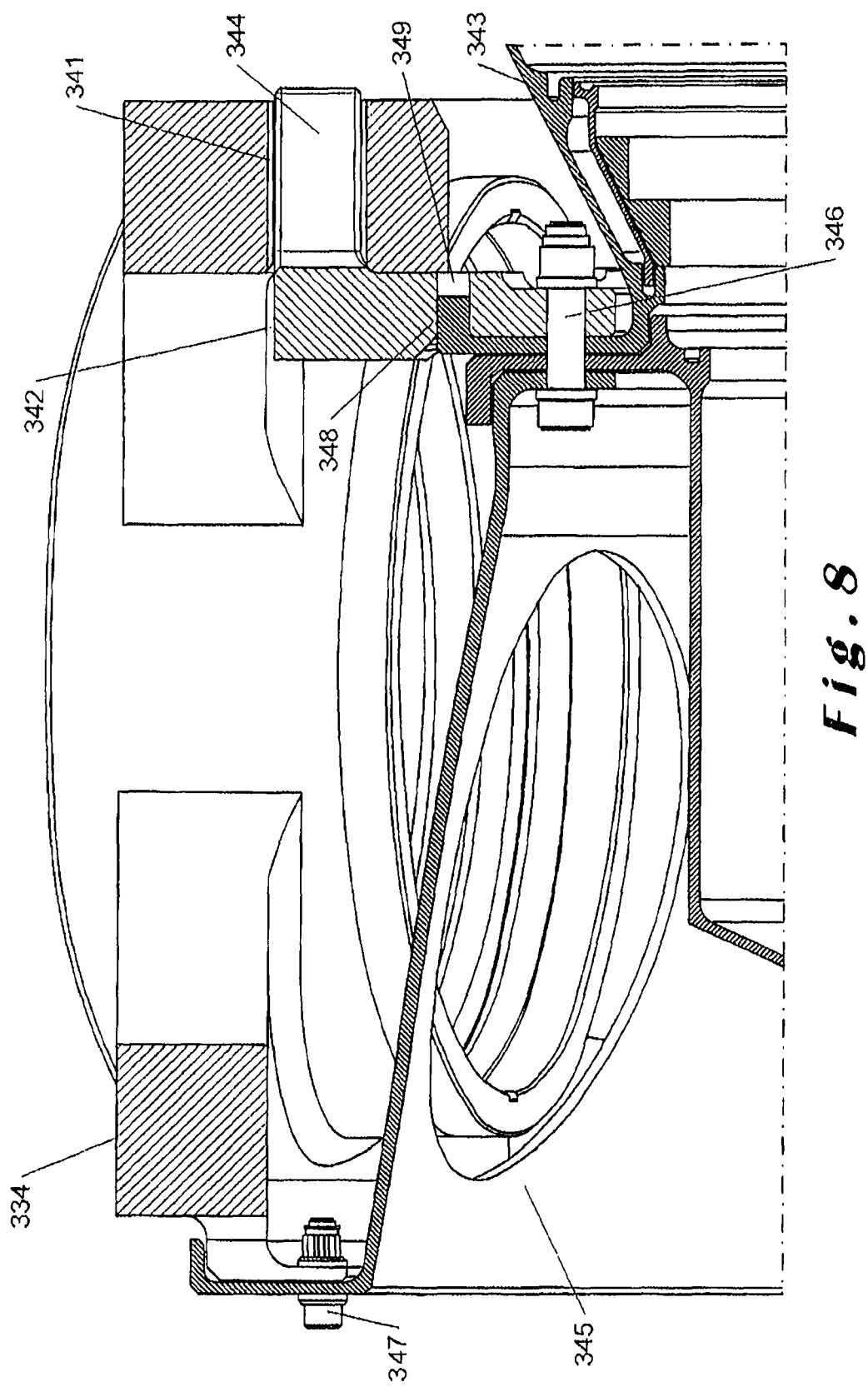
FIG. 8 shows a partial longitudinal section of the polygonal ring of FIG. 4 attached to a turboengine rotor element.

In a further embodiment, illustrated in FIGS. 4, 6 and 8, the back-up hooks of the polygonal ring 334 are not formed by pairs of pins with a round cross section but by lateral projections 344 of the radial plates 342 in the direction of the central axis C of the polygonal ring 334. The lateral projections 344 form a single piece with the plates 342. These lateral projections 344, the cross section of which is rectangular, are received with clearance in openings 341 with an elongate cross section in radial projections 340 of the ring 334.

As illustrated in FIG. 6, and in a manner similar to that of the first embodiment, the ring 334 is connected to the rotor element 343 by a securing flange 345. This securing flange 345 is attached to the rotor element 343 by bolts 346 and to the ring 334, on a side axially opposite the radial plates 342, by bolts 347.

The radial plates 342 are attached to the rotor element 343 by the same bolts 346 attaching the securing flange 345, bolts 346 are substantially oriented in the direction of the central axis C of the ring 334. Furthermore, the rotor element 343 has, for each plate 342, a central projection 348 engaging a central notch 349 in the plate 342, and two lateral projections 350 each in contact with a lateral edge 351 of the plate 342. Thus, these projections in the rotor element 343 form a positive engagement with the plate 342 in a radial plane perpendicular to the central axis of the ring 334.

As in the first embodiment of the invention, the plates 342 ensure the retention of the ring 334 in the event of rupture or substantial radial deformation of the ring 334 and/or the flange 345. In this embodiment, local torque in the radial plane is transmitted from the ring 334 to the plates 342 by the non-round cross section of the projections 344 and of the openings 341.

Despite the fact that the present invention has been described with reference to specific illustrative embodiments, it is obvious that different modifications and changes may be made to these examples without departing from the general scope of the invention as defined by the claims. For example, more than one radial plate could be placed between two adjacent radial recesses in the polygonal ring. These radial plates could be placed on the same side as the attachments for the polygonal ring to the securing flange, alternating said attachments and the plates. The back-up means could also be coupled to the ring rather than to the rotor element, and the openings receiving them then be coupled to the rotor element rather than to the ring. Consequently, the description and the drawings should be considered to be more illustrative than restrictive.

The invention claimed is:

1. A propeller hub with variable-pitch blades for a turboengine, comprising:
    a polygonal ring including substantially radial cylindrical recesses distributed about a central axis of the polygonal ring to receive the blades;
    a turbine rotor element of the turboengine;
    a securing flange attached to the polygonal ring so as to connect the polygonal ring to the turbine rotor element; and
    a plurality of back-up hooks inserted in an axial direction of the polygonal ring into openings with clearance in the openings, the back-up hooks being connected to either the polygonal ring or the turbine rotor element, and the openings being connected to the other one of the polygonal ring or the turbine rotor element.

2. The propeller hub as claimed in claim 1, wherein the back-up hooks are held by radial plates attached to the turbine rotor element.

3. The propeller hub as claimed in claim 2, wherein each radial plate bears at least two pins forming back-up hooks and that have a substantially circular cross section.

4. The propeller hub as claimed in claim 2, wherein the back-up hooks have a non-round cross section, as in the openings.

5. The propeller hub as claimed in claim 2, wherein the securing flange is attached to a first side of the polygonal ring, and the radial plates are placed on a second side of the polygonal ring axially opposite the first side.

6. The propeller hub as claimed in claim 2, further comprising a structure to attach the radial plates in a direction parallel to the central axis of the polygonal ring.

7. The propeller hub as claimed in claim 6, wherein the radial plates include a relief that allows positive engagement in a radial plane with a support of the radial plates.

8. A propeller comprising:
a propeller hub as claimed in claim 1; and
blades received in cylindrical recesses.

9. A turboengine comprising at least one propeller as claimed in claim 8.

10. The turboengine as claimed in claim 9, comprising two counter-rotating propellers.

11. The propeller hub as claimed in claim 1, wherein the openings are through-holes in the polygonal ring or the turbine rotor element.

12. A propeller hub with variable-pitch blades for a turboengine, comprising:
a polygonal ring including substantially radial cylindrical recesses distributed about a central axis of the polygonal ring to receive the blades;
a turbine rotor element of the turboengine;
a securing flange attached to the polygonal ring so as to connect the polygonal ring to the turbine rotor element; and
a plurality of back-up hooks inserted with clearance in openings, the back-up hooks being connected to either the polygonal ring or the turbine rotor element, and the openings being connected to the other one of the polygonal ring or the turbine rotor element, wherein
the back-up hooks are held by radial plates attached to the turbine rotor element, and wherein
each radial plate bears at least two pins forming back-up hooks and that have a substantially circular cross section.

13. A propeller hub with variable-pitch blades for a turboengine, comprising:
a polygonal ring including substantially radial cylindrical recesses distributed about a central axis of the polygonal ring to receive the blades;
a turbine rotor element of the turboengine;
a securing flange attached to the polygonal ring so as to connect the polygonal ring to the turbine rotor element; and
a plurality of back-up hooks inserted with clearance in openings, the back-up hooks being connected to either the polygonal ring or the turbine rotor element, and the openings being connected to the other one of the polygonal ring or the turbine rotor element, wherein
the back-up hooks are held by radial plates attached to the turbine rotor element, and wherein
the securing flange is attached to a first side of the polygonal ring, and the radial plates are placed on a second side of the polygonal ring axially opposite the first side.

* * * * *